(12) United States Patent
Snyder

(10) Patent No.: US 6,764,227 B2
(45) Date of Patent: Jul. 20, 2004

(54) INTERCONNECTING OPTICAL COMPONENTS WITH PASSIVE ALIGNMENT

(75) Inventor: Tanya J. Snyder, Edina, MN (US)

(73) Assignee: Agilent Technologies, Inc., Palo Alto, CA (US)

( * ) Notice: Subject to any disclaimer, the term of this patent is extended or adjusted under 35 U.S.C. 154(b) by 210 days.

(21) Appl. No.: 10/093,128

(22) Filed: Mar. 7, 2002

(65) Prior Publication Data

US 2003/0169976 A1 Sep. 11, 2003

(51) Int. Cl.$^7$ ................................................ G02B 6/36
(52) U.S. Cl. ........................................ 385/88; 385/49
(58) Field of Search ....................... 385/39, 49, 88–94

(56) References Cited

U.S. PATENT DOCUMENTS

| | | | |
|---|---|---|---|
| 4,181,402 A | | 1/1980 | Borsuk et al. |
| 5,357,590 A | * | 10/1994 | Auracher ..................... 385/33 |
| 5,633,968 A | | 5/1997 | Sheem |
| 5,764,836 A | | 6/1998 | Roff |
| 5,815,616 A | * | 9/1998 | Bishop et al. ................ 385/52 |
| 6,283,644 B1 | | 9/2001 | Gilliland et al. |
| 6,318,909 B1 | | 11/2001 | Giboney et al. |
| 6,394,666 B1 | * | 5/2002 | Minamino et al. ............ 385/90 |
| 6,517,259 B1 | * | 2/2003 | Murata ........................ 385/92 |
| 6,526,205 B1 | * | 2/2003 | Wilson et al. ................ 385/52 |

FOREIGN PATENT DOCUMENTS

| | | |
|---|---|---|
| GB | 2312779 | 11/1997 |
| WO | WO8200720 | 3/1982 |

OTHER PUBLICATIONS

"Plastic–Based Receptacle–Type VCSEL–Array Modules With One and Two Deimensions Fabricated Using theSelf--Alignment Mounting Technique"; Hideo Kosaka, Mikihiro Kajita, Mitsuki Yamada; Yoshimasa Sugimoto; Kazuhiko Kurata; Takashi Tanabe; Yasuhiko Kasukawa; 1997 IEEE ; 1977 Electronic Components and Technology Conference; pp. 382–390.

Low Cost/High Volume Laser Modules Using Silicon Optical Bench Teachnology; J.W. Osenbach, M.F. Dautartas E. Pitman, C. Nijanader, M. Brady, R.K. Schlenker, T. Butrie, S.P. Salko, B.S. Auker, D. Kern, S. Salko, D. Rinaudo, C. Whitecraft, and J.F. Dormer; 1998 Electronics Components and Technology Conference; pp. 581–587.

Face–Lock Optical Fiber Connector Design and Fabrication S. Sheem, G. Zhang, E. Allen, S. Lu, S. Low; Berkeley Optics Company, 1977 *IEEE*; 1977 Electronic Components and Technology Conference; pp. 410–413.

* cited by examiner

Primary Examiner—Ellen E. Kim

(57) ABSTRACT

A system is described for interconnecting a first optical component and a second optical component in which the first optical component is guided passively into precise alignment with the second optical component. The system includes a base and a guide structure. The base has a first surface exposed for contact with a front surface of the first optical component and a second surface configured to contact a front surface of the second optical component, and defines a transparent optical aperture extending from the first base surface to the second base surface and aligned with respect to the optical axis. The guide structure is supported by the base in fixed registration with respect to the optical axis and is exposed for contact with an exposed peripheral surface of the first optical component at three or more spaced apart discrete locations. The passive alignment system may be used with a wide variety of different optical connectors, including connectors implemented in accordance with existing optical connection standards, without the need for proprietary interlocking features or special modification.

25 Claims, 3 Drawing Sheets

INTERCONNECTING OPTICAL COMPONENTS WITH PASSIVE ALIGNMENT

CROSS-REFERENCE TO RELATED APPLICATIONS

This application relates to the following co-pending U.S. Patent Applications, each of which in incorporated herein by reference: U.S. patent application Ser. No. 09/688,064, filed Oct. 13, 2000, by David B. Miller et al., and entitled "Aligning an Optical Device System with an Optical Lens System;" and U.S. patent application Ser. No. 09/687,934, filed Oct. 13, 2000, by Robert E. Wilson et al., and entitled "Method and Apparatus for the Passive Alignment of Optical Components."

TECHNICAL FIELD

This invention relates to systems and methods of interconnecting optical components with passive alignment.

BACKGROUND

In order to achieve efficient and reliable transmission of optical data signals, optical components in the signal path must be aligned precisely. When aligning optical network components, there are three main elements which must be precisely aligned: the active regions of opto-electronic devices that transmit and receive the optical data signals; the optical lenses that focus and direct the optical signals; and the optical fibers that carry the focused optical data signals between the transmitters and receivers. Because optical fibers have such small dimensions, however, the alignment of these fibers with other fibers, lenses and optical devices is difficult and costly. Optical components (e.g., optical fibers, lenses, and devices) typically must be aligned with an offset error that on the order of a few microns, or less.

Efforts have been made to simplify the problem of aligning the registration elements of an optical transceiver module with the fibers of a fiber optic ribbon interconnect. In one single-fiber alignment approach, the optoelectronic device is die and wire bonded to a transceiver package so that it may be biased to its normal operating condition. The input end of the fiber is mechanically manipulated in front of the active region of the optoelectronic device until an optical coupling between the fiber and the optoelectronic device is achieved. After the optimal coupling has been achieved, the optoelectronic device is bonded in place. This process requires either human interaction or expensive equipment that automatically dithers the fiber into the optimal position. This conventional alignment process becomes significantly more complicated when applied to the coupling of arrays of optical fibers with arrays of optoelectronic devices. Additional difficulties arise when an optical lens system must be aligned between the optoelectronic devices and the optical fibers.

Still other schemes for aligning optical components have been proposed. For example, U.S. Pat. No. 5,633,968 has proposed an optical component interconnection scheme in which there are two connecting surfaces with matching surface features, and one optical component is located at a predetermined location on the first surface, and the other optical component is located at a matching location on the second surface. When the two surfaces are mated in a face-to-face fashion, they are locked into a stable position through the matched surface features. The first and the second optical components are aligned properly as they are located at a same spot with respect to the face-locking surface features. The unique surface features and the locations of the optical components may be registered by a lithographic method that has sub-micron accuracy.

SUMMARY

The invention features a system for interconnecting a first optical component and a second optical component in which the first optical component is guided passively into precise alignment with the second optical component. The passive alignment system of the invention may be used with a wide variety of different optical connectors, including connectors implemented in accordance with existing optical connection standards, without the need for proprietary interlocking features or special modification.

In one aspect, the invention features a system for interconnecting a first optical component and a second optical component in alignment with respect to a common optical axis. The system comprises a base and a guide structure. The base has a first surface exposed for contact with a front surface of the first optical component and a second surface configured to contact a front surface of the second optical component, and defines a transparent optical aperture extending from the first base surface to the second base surface and aligned with respect to the optical axis. The guide structure is supported by the base in fixed registration with respect to the optical axis and is exposed for contact with an exposed peripheral surface of the first optical component at three or more spaced apart discrete locations.

Embodiments in accordance with this aspect of the invention may include one or more of the following features.

The guide structure preferably is exposed for contact with the exposed peripheral surface of the first optical component at locations axially displaced from the first base surface. The guide structure may be exposed for contact with the exposed peripheral surface of the first optical component at locations concentrically circumscribing the optical axis. The guide structure preferably is configured to guide the first optical component into alignment with the optical axis with a transverse offset on the order of 4 microns or less.

In some embodiments, the guide structure comprises a set of three or more alignment elements secured to the base. The alignment elements may be substantially spherical in shape. In some embodiments, the alignment elements are bonded to the base (e.g., by anodic bonding). In other embodiments, the alignment elements are secured to the base by a retainer. The base may comprise a set of positioning cavities in the front base surface constructed to laterally restrain the alignment elements in fixed registration with respect to the optical axis. The positioning cavities may be characterized by sloped sidewalls. The positioning cavities may be defined photolithographically. For example, the positioning cavities may have surfaces corresponding to (111) planes anisotropically etched into a silicon substrate.

In some embodiments, the second optical component comprises an optical lens system secured to the base in fixed registration with respect to the optical axis. In other embodiments, the optical lens system is integrated into the base. The second optical component preferably further comprises an optical device system secured in fixed registration with respect to the optical axis. The second optical component may further comprise a spacer substrate secured between the optical lens system and the optical device system.

In another aspect, the invention features a method of fabricating the above-described optical component interconnection system.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1A:
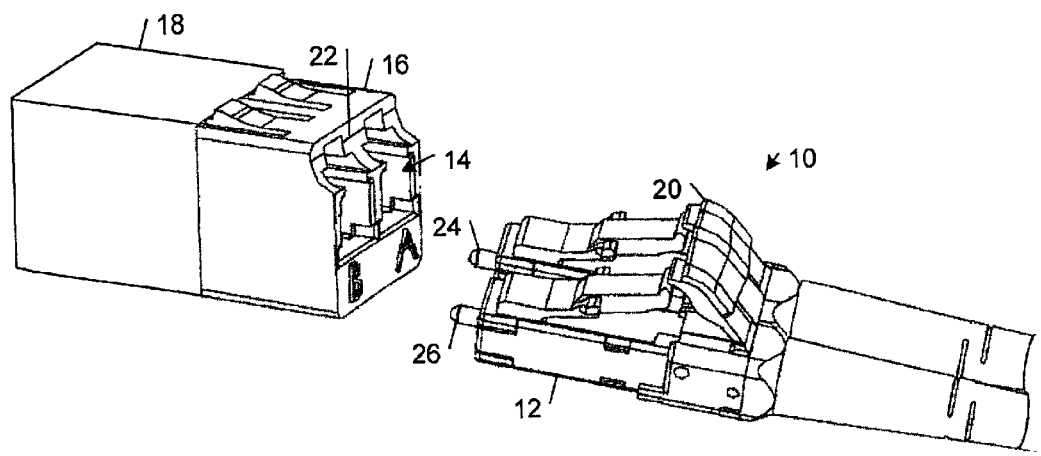
FIG. 1A is a diagrammatic perspective view of a system for interconnecting a first optical component and a second optical component in alignment with respect to a common optical axis, with the optical components in an unconnected state.
Figure 1B:
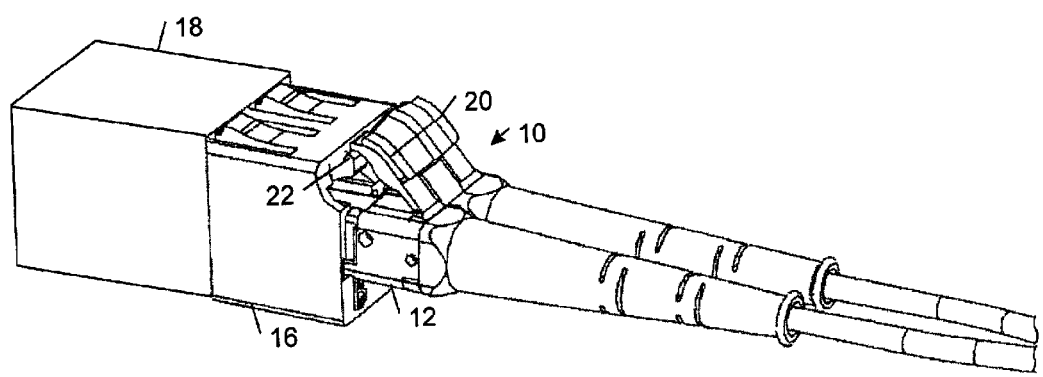
FIG. 1B is a diagrammatic perspective view of the optical component interconnection system of FIG. 1A, with the optical components in a connected state.

Referring to FIGS. 1A and 1B, in one embodiment, a first optical component 10 (e.g., a fiber optic cable system) includes a plug 12 that may be inserted into a mating socket (or receptacle) 14 of a header block 16 that incorporates a second optical component 18 (e.g., a fiber optic transmitter system, a fiber optic receiver system, or a fiber optic transceiver system). In the illustrated embodiment, plug 12 and socket 14 are implemented as mating LC-type connectors. In other embodiments, the physical connection mechanism may be implemented in any one of a wide variety of different ways. For example, plug 12 and socket 14 may conform to any one of a variety of optical interface standards, including HSSDC2-type, RJ-type, SC-type, SG-type, ST-type, FDDI-type, FC-type, D4-type and Biconic-type connectors. Plug 12 includes a latch 20 that catches on a lug 22 of header block 16 to lock first optical component 10 in contact with second optical component 20. In the illustrated embodiment, when plug 12 is engaged with socket 14, proximal faces of a pair of registration elements 24, 26 (e.g., fiber optic ferrules) are urged against a pair of corresponding registration elements of optical component 18. Each registration element 24, 26 of first optical component 10 may include a single optical fiber or multiple optical fibers. In other embodiments, the optical fibers are located adjacent to one or more registration elements, rather than incorporated within the registration elements. The registration elements may be cylindrical in shape, as illustrated, or they may have a different shape (e.g., rectangular). Registration elements 24, 26 preferably are mounted inside plug 12 with a compliant float so that registration elements 24, 26 remain in contact with the corresponding registration elements of optical component 18. Latch 106 may be depressed to release plug 12 from socket 14 and, thereby, separate first optical component 10 from second optical component 18.

As explained in detail below, header block 16 houses a system for interconnecting first optical component 10 and second optical component 18 in precise alignment with respect to a common optical axis. The optical component interconnection system includes a guide structure that passively guides first optical component 10 into alignment with second optical component 18 with a transverse offset that preferably is on the order of 4 μm or less. The passive alignment system may be used with a wide variety of different optical connectors, including connectors implemented in accordance with existing optical connection standards, without the need for proprietary interlocking features or special modification.

Figures 2A, 2B:
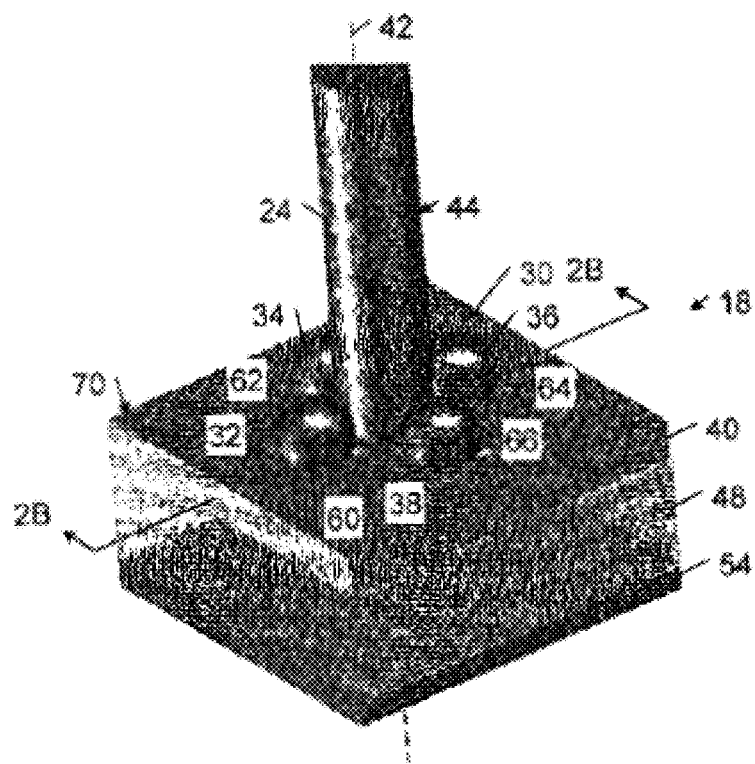
FIG. 2A is a diagrammatic perspective view of a guide structure laterally retaining a first optical component in alignment with a second optical component.
FIG. 2B is a cross-sectional side view of the guide structure and optical components of FIG. 2A taken along the line 2B—2B.

Referring to FIGS. 2A and 2B, in one embodiment, a guide structure 30 includes a set of four alignment elements 32, 34, 36, 38 that are supported by a base 40 in fixed, precise registration with respect to an optical axis 42. Guide structure 30 is exposed for contact with an exposed peripheral surface 44 of registration element 24 at four discrete spaced apart locations. In particular, each alignment element 32–38 is positioned on base 40 to tangentially contact the exposed peripheral surface 44 of registration element 24 when registration element 24 is inserted into socket 14 (see FIG. 1A). In this way, guide structure 30 may passively guide registration element into precise alignment with optical axis 42.

As shown in FIG. 2A, in one embodiment, registration element 24 incorporates a central optical fiber 46 that is aligned with optical axis 42 when registration element 24 is positioned properly by guide structure 30. Second optical component 18 includes an optical lens system 48 and an optical device system 50, which has a substrate supporting an optical device. The optical device may be, for example, a light detector, such as a p-i-n diode, or a light-emitter, such as a VCSEL, other surface emitting device, and an edge-emitting laser. The optical device also may be an integrated device that combines one or more devices, such as the combination of VCSELs and transistors, and photo-detectors and transistors. The optical device is designed to transmit (receive) optical signals to (from) optical fiber 46 through optical lens system 48. Optical lens system 48 has an optical element (not shown) that may include a device-side optical lens or a fiber-side optical lens, or both. The optical lenses may be diffractive or refractive optical lenses that are formed on an optical substrate (e.g., a glass or quartz substrate). During manufacture, optical device system 50 is aligned precisely with respect to optical lens system 48 in the X-Y plane (i.e., orthogonal to a Z-axis 52, which corresponds to the optical axis 42) with an accuracy on the order of 4 μm or less, and more preferably on the order of 2 μm or less. A spacer 54 may be secured between optical device system 50 and optical lens system 48 to achieve a desired focal distance between optical device system 50 and optical lens system 48. In the illustrated embodiment, the Z-axis alignment is achieved by adjusting the thickness dimension 56 of spacer 54. Spacer 54 includes an aperture 58 that permits light to be transmitted between optical device system 50 and optical lens system 48.

In some embodiments, base 40, optical lens system 48 and spacer 54 are secured together to form an optical sub-assembly. Base 40 and spacer 54 may be precision-bonded to optical lens system 48 by a conventional bonding process, including an adhesive bonding process, a metal-to-metal bonding process, a glass seal bonding process, and a wafer bonding process. In some embodiments, the optical lens system is integrated into the base. Photolithographically-defined fiducial patterns may be used to precisely align base 40 and spacer 54 during the bonding process. Optical device system 48 may be precision-bonded to spacer 54 by, for example, a flip-chip bonding process or a solder re-flow process (see, e.g., U.S. patent application Ser. No. 09/688,064, filed Oct. 13, 2000, by David B. Miller et al., and entitled "Aligning an Optical Device System with an Optical Lens System").

In some embodiments, each of base 40 and spacer 54 is formed from an etchable material (e.g., a semiconductor, such as silicon and gallium arsenide). Base 40 may be etched to form positioning cavities 60, 62, 64, 66 for registering and laterally restraining alignment elements 32–38. Base 40 also may be etched to form a transparent optical aperture 68 (e.g., a through hole) that extends through base 40 to allow light to travel between optical lens system 48 and optical fiber 46. Positioning cavities 60–66 may be formed by a conventional photolithographically-based etching technique, including chemical etching (e.g., anisotropic etching) and reactive ion etching. For example, in some embodiments, the positioning cavities may have surfaces corresponding to (111) planes anisotropically etched into a silicon substrate. The formation of positioning cavities 60–66 by photolithographically-based etching techniques allows positioning cavities 152 to be quickly and easily produced and allows positioning cavities 60–66 to be precisely located on an exposed top surface 70 of base 42. Currently available etching techniques allow precision positioning of elements to within 1 $\mu$m, thus positioning cavities 60–66 may be precisely micromachined to within 3 $\mu$m and usually within 1 $\mu$m of the desired location to achieve an overall alignment precision between second optical component 20 and registration element 24 on the order of 4 $\mu$m or less, and usually on the order of 2 $\mu$m or less, depending upon the particular etching and alignment techniques selected. In some embodiments, base 40 may be formed of plastic and shaped by a conventional high-precision molding technique.

In some embodiments, each of positioning cavities 60–66 is formed as a square V-shaped cavity (or pit), as described in U.S. patent application Ser. No. 09/687,934, filed Oct. 13, 2000, by Robert E. Wilson et al., and entitled "Method and Apparatus for the Passive Alignment of Optical Components." In these embodiments, the square V-shaped positioning cavities have sloped side walls with a fixed angle with respect to interface surface 160 regardless of the aperture size. Such angled sidewalls provide a plurality of advantages, including precise positioning of alignment elements 32–66 within the center of positioning cavities 60–66, as well as compensating for slight manufacturing deviations from design parameters. For example, if a positioning cavity or an alignment element, or both, is slightly larger or smaller than specified dimensions, an effective fit between the alignment element and the positioning cavity still is maintained. Angled sidewalls also allow the positioning cavities to accommodate alignment balls of different sizes while still maintaining the precise positioning accuracy needed to correctly align the optical components. In other embodiments, positioning cavities 60–66 may have characteristic shapes that differ from a square V-shape. For example, positioning cavities 60–66 may be formed as cylindrical holes having vertical sidewalls, or as cone-shaped cavities. In some embodiments, positioning cavities 32–38 may be formed between ridges or other protruding structures that extend up from top surface 70 of base 40 such that alignment elements 32–38 are positioned between protruding ridges. In some embodiments, positioning cavities 60–66 extend through base 40.

In the illustrated embodiment, alignment elements 32–38 are implemented in the form of spherical balls. In this form, alignment elements 32–38 may be placed (or positioned) easily within positioning cavities 60–62 without the need for any further alignment. Alignment elements preferably are configured as substantially spherical bodies to simplify construction of the optical sub-assembly. Spherically-shaped alignment elements also allow registration elements 24, 26 to slip easily over the spherical surfaces and into alignment. In other embodiments, alignment elements 60–66 may have different shapes, such as cubic, tetragonal, orthorhombic, triclinic, monoclinic, trigonal and hexagonal shapes. Still other alignment elements shapes are possible. In these embodiments, the corners exposed for contact with the registration elements of optical component 10 preferably are rounded. Alignment elements 60–66 may be formed in any size or diameter that achieves the goal of laterally positioning and retaining registration elements 24, 26. Alignment elements 60–66 preferably contact the exposed peripheral surface 44 of registration element 24 at locations that are axially displaced from the top surface 70 of base 40. In one embodiment, alignment elements 60–66 preferably contact the exposed peripheral surface 44 of registration element 24 at locations that are displaced from the top surface 70 of base 40 on the order of about 50 $\mu$m or greater. Alignment elements 60–66 may be constructed from any convenient material that may be formed into a sphere having precise dimensions and sufficient rigidity (or compression strength), including stainless steel, glass, sapphire, high carbon steel, ceramic, and plastic. In some embodiments, alignment elements 60–66 may have different diameters. Alignment elements 32–38 may be fixed (or secured) within positioning cavities 60–66 by a conventional bonding process, including adhesive bonding, metal-to-metal bonding, and anodic bonding.

In some embodiments, each of the base 40, and optical lens system 48 and optical device system 50 are formed in arrays on respective wafer substrates. The individual wafer substrates may be combined to complete a plurality of optical sub-assemblies that may be separated easily into individual components. This feature allows large numbers of optical sub-assemblies to be produced at substantially the same time. For example, in one embodiment, after a base wafer, an optical lens system wafer, and a spacer wafer have been fabricated (including etching of positioning cavities and apertures in the base and spacer wafers), the wafers are stacked, aligned, and bonded (or secured) in position, as described above. After the wafers are aligned and bound together, the positioning cavities that are formed in the base wafer may be populated with alignment elements, which may be fixed (or secured) into the positioning cavities 152 by a bonding process, as described above. In some embodiments, the alignment elements may be fixed into the positioning cavities before the base wafer is bonded to the optical lens system wafer. Once complete, the composite stack of wafers may be cut to separate the resulting plurality of individual, precisely configured and constructed optical sub-assemblies. In some embodiments, an optical device system substrate containing an array of optical device systems may be fixed to the spacer wafer before or after the optical sub-assemblies are separated. After the optical sub-assemblies have been separated, I/O pads and optical alignment features may be incorporated into each optical sub-assembly. At this point, the optical sub-assemblies may be tested individually and burned-in. In sum, large numbers of high precision optical sub-assemblies may be mass produced at substantially the same time, without the need to actively align each optical sub-assembly because of the improved alignment provided by the passive alignment system.

Other embodiments are within the scope of the claims.

Figure 3:
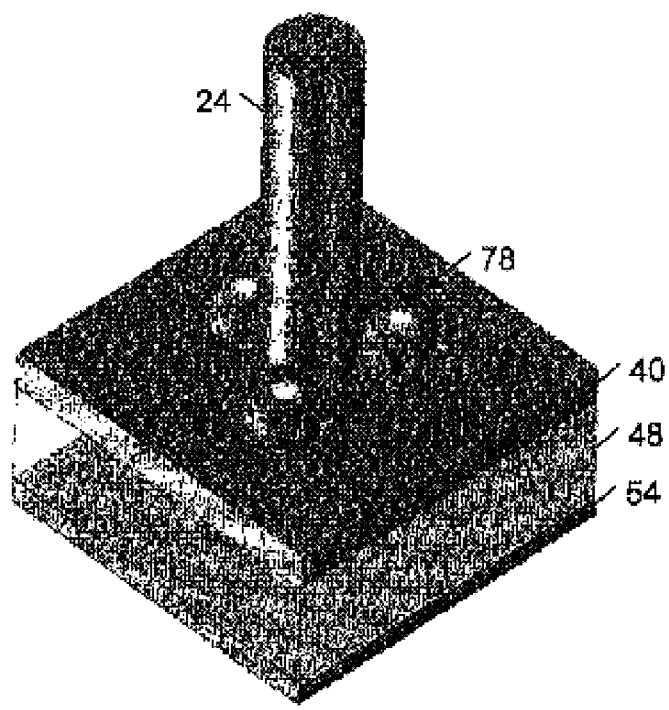
FIG. 3 is a diagrammatic perspective view of a system that includes three spaced apart alignment elements for aligning a first optical component and a second optical component in alignment with respect to a common optical axis.

For example, as shown in FIG. 3, in other embodiments, a guide structure 78 may include a different number (e.g., three in the illustrated embodiment) of alignment elements so long as the guide structure serves the functions of laterally guiding and retaining the registration elements of first optical component 10. In general, in these embodiments, the guide structure should include three or more alignment elements at locations concentrically circumscribing the optical axis.

Figure 4:
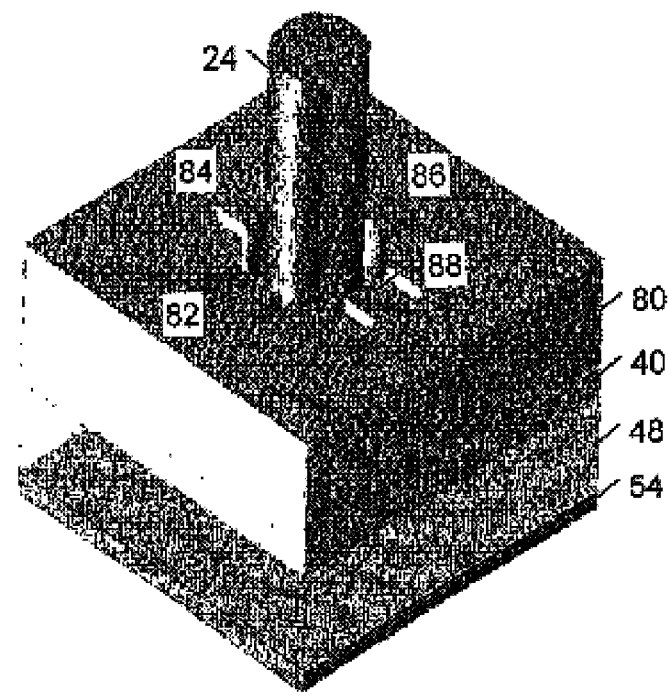
FIG. 4 is a diagrammatic perspective view of an optical component interconnection system that includes alignment elements secured to a base by a retainer.

Referring to FIG. 4, in other embodiments, the alignment elements may be secured by a retainer 80 that is constructed and arranged to sit over alignment elements on base 40 and retain each alignment element in a respective positioning cavity. In the illustrated embodiment, retainer 80 includes flange-like protrusions 82, 84, 86, 88 that contact the top portions of the alignment elements to restrain movement in the z-(or optical axis) direction. In these embodiments, the alignment elements may be bonded or un-bonded to base 40. In other embodiments, retainer 80 may have an etched array of retaining cavities that correspond to the array of positioning cavities formed in base 40 and are disposed in contact with the top surfaces of the alignment elements.

Still other embodiments are within the scope of the claims.

What is claimed is:

1. A system for interconnecting a first optical component and a second optical component in alignment with respect to a common optical axis, comprising:
   a base having a first surface exposed for contact with a front surface of the first optical component and a second surface configured to contact a front surface of the second optical component, and defining a transparent optical aperture extending from the first base surface to the second base surface and aligned with respect to the optical axis; and
   a guide structure supported by the base in fixed registration with respect to the optical axis and exposed for contact with an exposed peripheral surface of the first optical component at three or more spaced apart discrete locations, wherein the guide structure is exposed for contact with the exposed peripheral surface of the first optical component at locations, concentrically circumscribing the optical axis.

2. The system of claim 1, wherein the guide structure is exposed for contact with the exposed peripheral surface of the first optical component at locations axially displaced from the first base surface.

3. The system of claim 1, wherein the guide structure is configured to guide the first optical component into alignment with the optical axis with a transverse offset on the order of 4 microns or less.

4. The system of claim 1, wherein the guide structure comprises a set of three or more alignment elements secured to the base.

5. The system of claim 4, wherein the alignment elements are substantially spherical in shape.

6. The system of claim 4, wherein the alignment elements are bonded to the base.

7. The system of claim 4, wherein the alignment elements are secured to the base by a retainer.

8. The system of claim 4, wherein the base comprises a set of positioning cavities in the front base surface constructed to laterally restrain the alignment elements in fixed registration with respect to the optical axis.

9. The system of claim 8, wherein the positioning cavities are characterized by sloped sidewalls.

10. The system of claim 8, wherein the positioning cavities are defined photolithographically.

11. The system of claim 10, wherein the positioning cavities have surfaces corresponding to (111) planes anisotropically etched into a silicon substrate.

12. The system of claim 1, wherein the second optical component comprises an optical lens system secured to the base in fixed registration with respect to the optical axis.

13. The system of claim 12, wherein the second optical component further comprises an optical device system secured in fixed registration with respect to the optical axis.

14. The system of claim 13, wherein the second optical component further comprises a spacer substrate secured between the optical lens system and the optical device system.

15. The system of claim 12, wherein the optical lens system is integrated into the base.

16. A method of fabricating a system for interconnecting a first optical component and a second optical component in alignment with respect to a common optical axis, comprising:
   forming a base having a first surface exposed for contact with a front surface of the first optical component and a second surface configured to contact a front surface of the second optical component, and defining a transparent optical aperture extending from the first base surface to the second base surface and aligned with respect to the optical axis; and
   forming a guide structure supported by the base in fixed registration with respect to the optical axis and exposed for contact with an exposed peripheral surface of the first optical component at three or more spaced apart discrete locations, wherein the guide structure is exposed for contact with the exposed peripheral surface of the first optical component at locations concentrically circumscribing the optical axis.

17. The method of claim 16, further comprising forming a set of positioning cavities in the front base surface constructed to laterally restrain the alignment elements in fixed registration with respect to the optical axis.

18. The method of claim 17, wherein the positioning cavities are characterized by sloped sidewalls.

19. The method of claim 17, wherein forming the guide structure comprises securing a set of three or more alignment elements in the positioning cavities.

20. The method of claim 19, wherein the alignment elements are secured in to the positioning cavities by bonding.

21. The method of claim 19, wherein the alignment elements are secured in the positioning cavities by a retainer.

22. The method of claim 21, wherein the positioning cavities are formed by a photolithographic process.

23. The method of claim 16, further comprising securing the second optical component to the second base surface.

24. The method of claim 16, further comprising forming the second optical component by securing an optical lens system with respect to an optical device system.

25. The method of claim 24, wherein forming the second optical component further comprises securing a spacer between the optical lens system and the optical device system.

* * * * *